United States Patent Office 3,352,895
Patented Nov. 14, 1967

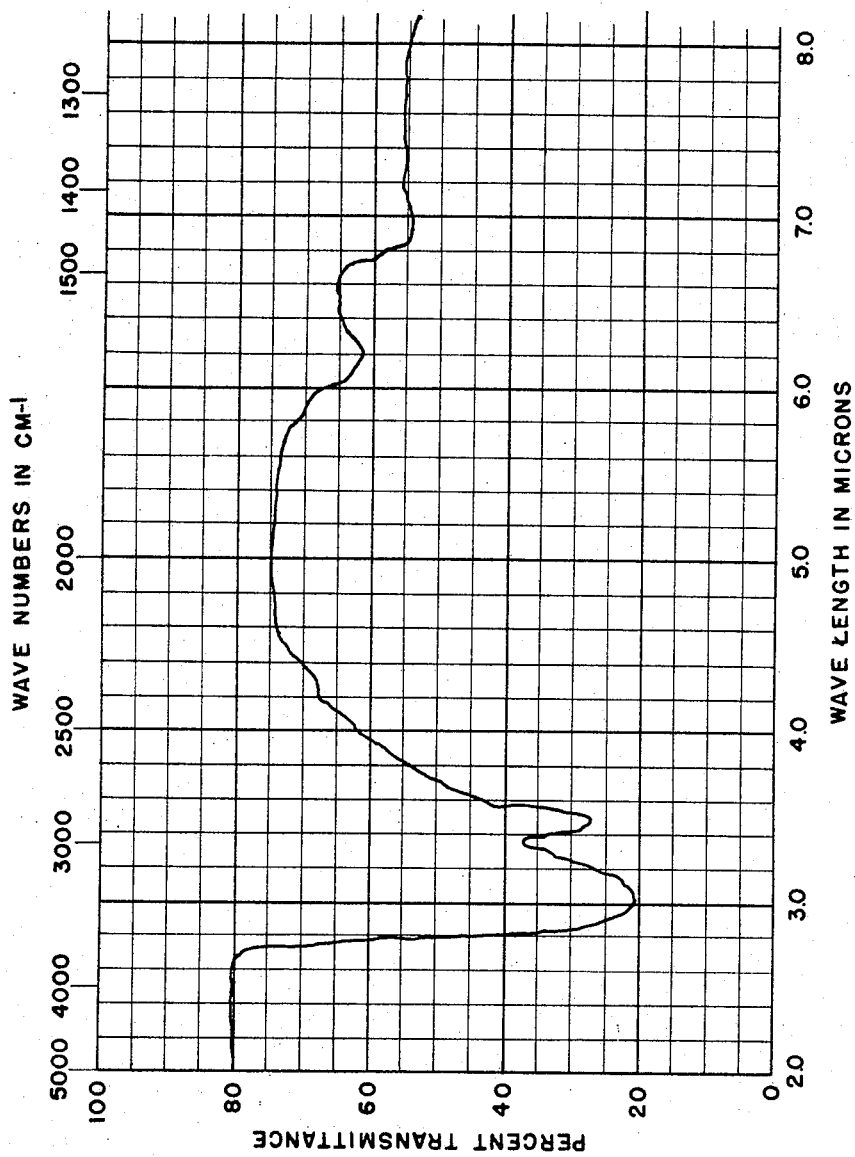

3,352,895
HYDROXYALUMINUM GLYCERATE AND METHOD OF MAKING SAME
James M. Holbert, Lookout Mountain, and Benjamin H. Gross, Chattanooga, Tenn., assignors to Chattem Drug & Chemical Company, a corporation of Tennessee
Filed July 9, 1964, Ser. No. 381,449
5 Claims. (Cl. 260—448)

ABSTRACT OF THE DISCLOSURE

An improved antacid compound, hydroxyaluminum glycerate, having prolonged acid neutralization characteristics. The compound may be produced by reacting equimolar quantities of an aluminum alkoxide containing from 2 to 5 carbon atoms in each alkyl group, glycerin, and water in a reaction medium of an anhydrous alcohol.

---

The present invention deals with improved aluminum derivatives which have particular utility as antacid compositions.

Many aluminum compounds, particularly aluminum hydroxide and modifications thereof, have the capacity to neutralize dilute hydrochloric acid. Aluminum hydroxide in the form of a gel has been widely used as an antacid, but this material suffers from the defect that upon drying it tends to lose its acid consuming power. As a result of this difficulty, various modified forms of aluminum hydroxide have been suggested by workers in this field. One such modification is the stabilization of the hydroxide by the addition of various carbohydrates. A polymeric aluminum hydroxide hexitol complex has been prepared and is described as a stable and effective antacid. Still other stable antacids based upon aluminum hydroxide are the compounds dihydroxyaluminum aminoacetate and dihydroxyaluminum sodium carbonate.

The present invention is directed to another derivative of aluminum hydroxide which has high acid consuming power, rapid action, moderate cost, and low toxicity.

One of the objects of the present invention is to provide a new aluminum hydroxide derivative which is considerably more stable than aluminum hydroxide gel.

Another object of the invention is to provide a new aluminum hydroxide derivative having excellent antacid properties as evidenced by a high acid consuming power.

Another object of the invention is to provide a modified aluminum hydroxide antacid which maintains its antacid properties over prolonged periods.

It has now been found that a reaction product obtained by reacting equimolar quantities of an aluminum alkoxide containing from 2 to 5 carbon atoms in each alkyl group, glycerin, and water in a reaction medium consisting of an anhydrous alcohol produces a new antacid material which we have called hydroxyaluminum glycerate. This compound has the empirical formula $C_3H_7AlO_4$. Analysis of the compound produced in the manner hereinafter described indicates an aluminum content of 19.6%, whereas the theoretical aluminum content of a compound having the above noted formula is 20.1%. Other evidence which tends to support the formula recited above includes the stoichiometry of the interaction, the yield of the product, and the homogeneous nature of the powder produced.

We believe the structure of the hydroxyaluminum glycerate to be as follows:

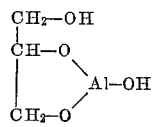

It is entirely possible, however, that the material may be polymeric in nature but we are reasonably sure that the monomer of the polymeric material has the structural formula indicated above.

In the preparation of the new compound, substantially equimolar amounts of an aluminum alkoxide such as aluminum isopropoxide, glycerin, and water are reacted in an anhydrous alcohol reaction medium, such as isopropanol. The compounds are reacted at temperatures ranging from about 40° C. up to the boiling point of the alcohol involved. The reaction results in the formation of a thick mixture which changes to a thin slurry within a short time. The product may then be isolated from the slurry either by filtration, or evaporation, or a combination of these methods.

The following specific examples illustrate the preparation of the improved compound of the present invention.

Example I

One mole of USP glycerin and one mole of water were added to 500 mls. of anhydrous isopropyl alcohol in a stainless steel beaker equipped with a high speed stirrer. The glycerin solution was warmed to about 60° C. and then a warm solution (about 60° C.) of one mole of molten aluminum isopropoxide and 500 mls. of anhydrous isopropyl alcohol was added with vigorous stirring over a period of about 3 minutes. A thick mixture was formed which changed into a thin slurry within about 5 minutes. The hot slurry was then stirred for an additional ½ hour and then the product was isolated.

The product may be isolated from the slurry by filtration with the aid of suction. The filter cake recovered in this manner is allowed to stand overnight in the air at room temperature. During this time, the isopropyl alcohol evaporates to yield a white powder weighing about 160 grams (based upon the proportions previously mentioned). Heating of this solid in an oven at 105° C. for 5 to 7 hours yields an odorless white powder weighing about 137 grams. The evaporation of the filtrate obtained yielded essentially no residue.

Still another method of isolation of the product involves evaporation of the solvent present. Small portions of the reaction mixture may be placed in a large evaporating dish and warmed with stirring to change the slurry into a powder. Heating of this material in an oven at 105° C. for 5 to 7 hours yielded an odorless white powder weighing about 134 grams.

The yields which were obtained under various isolation procedures, and at various drying conditions are summarized in the following table, the reaction being based upon 1 gram molecular weight each of the glycerin, aluminum isopropoxide, and water:

*Table I*

| Batch No. | Isolation Procedure | Drying Conditions | Yield, g. |
|---|---|---|---|
| 103 | Filtration | 5 hrs. at 105° C | 138 |
| 110 | Evaporation | 5 hrs. at 105° C | 134 |
| 114 | Filtration | 7 hrs. at 105° C | 137 |
| 116 | do | 7 hrs. at 25° C | 135 |
| 129 | do | 6 days at 25° C | 157 |
| 131 | do | 7 hrs. at 105° C | 137 |
| 133 | Evaporation | 7 hrs. at 105° C | 134 |

The antacid properties of hydroxyaluminum glycerate have been evaluated by two quantitative determinations. The acid consuming power is a measure of the total neutralizing capacity of a material. The prolonged neutralization is a measure of the duration of the buffering effect.

The acid consuming power was determined by a procedure described on page 197 of The National Formulary X. A summary of the results from several batches is given in the following table:

Table II

| Batch: | Acid consuming power (ml. of N/10 HCl/g.) |
|---|---|
| 103 | 200.4 |
| 110 | 209.8 |
| 114 | 199.5 |
| 116 | 200.4 |
| 129 | 177.8 |
| 131 | 206.9 |
| 133 | 208.6 |

The prolonged neutralization characteristics were determined as described on page 197 of The National Formulary X. The results obtained indicated that the hydroxyaluminum glycerate was able to maintain the pH of the solution at a value above 4.0 for about 90 minutes, and above 3.5 for 140 minutes.

The new antacid compound evidences a substantial degree of thermal stability. This is indicated by the fact that the material may be warmed at 105° C. to facilitate the removal of the solvents. When the compound is heated at 105° C. for 24 hours, there is only a slight loss of weight and a decrease in the acid consuming capacity.

An investigation of the acute oral toxicity of hydroxyaluminum glycerate has also been carried out. Samples of the product were suspended in a 1% aqueous tragacanth solution and given to a female mice by stomach tube. Both samples were given to groups of five mice each at levels of 10 grams per kilogram, 5 grams per kilogram, and 1 gram per kilogram. No immediate evidence of toxicity was observed.

The absence of toxicity appears to confirm the expectation that the compound hydrolyzes in vivo to yield the relatively harmless products, aluminum hydroxide and glycerin.

The single figure on the drawings is a reproduction of the infrared spectrum of the compound hydroxyaluminum glycerate as prepared by the method of Example I. As evident from the plot, minimum transmittance occurs at a wave length of about 3.0 microns, and a secondary minimum occurs at about 3.5 microns. Absorption at 3.5 microns is characteristic for carbon to hydrogen bonds, and indicates clearly the important role of glycerol in the structure of the new compound.

It should be evident that various modifications can be made to the described embodiments without departing from the scope of the present invention.

We claim:

1. The compound hydroxyaluminum glycerate having the empirical formula $C_3H_7AlO_4$.

2. The method of preparing hydroxyaluminum glycerate which comprises reacting substantially equimolar amounts of aluminum isopropoxide, glycerin, and water in a reaction medium of anhydrous isopropyl alcohol and recovering the product so produced.

3. The method of preparing hydroxyaluminum glycerate which comprises reacting substantially equimolar amounts of aluminum isopropoxide, glycerin, and water in a reaction medium of anhydrous isopropyl alcohol at a temperature of from 40° C. to the boiling point of the alcohol, and recovering the product so produced.

4. The method of preparing hydroxyaluminum glycerate which comprises reacting substantially equimolar amounts of aluminum isopropoxide, glycerin, and water in a reaction medium of anhydrous isopropyl alcohol, filtering the resulting slurry, and recovering the hydroxyaluminum glycerate thus produced.

5. The method of preparing hydroxyaluminum glycerate which comprises reacting substantially equimolar amounts of aluminum isopropoxide, glycerin, and water in a reaction medium of anhydrous isopropyl alcohol, evaporating off the alcohol solvent present, and recovering the hydroxyaluminum glycerate thus produced.

References Cited

UNITED STATES PATENTS

| 1,990,442 | 2/1935 | Traube | 260—439 |
| 2,917,366 | 12/1959 | Hansford | 260—448 |
| 3,198,332 | 3/1965 | Davison | 260—448 |

TOBIAS E. LEVOW, *Primary Examiner.*